(12) United States Patent
Tammana et al.

(10) Patent No.: US 11,985,540 B2
(45) Date of Patent: May 14, 2024

(54) CONTROL-PLANE OVERLOAD MANAGEMENT

(71) Applicant: T-Mobile Innovations LLC, Overland Park, KS (US)

(72) Inventors: Deepak Nadh Tammana, Bothell, WA (US); Roopesh Kumar Polaganga, Bothell, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 162 days.

(21) Appl. No.: 17/646,180

(22) Filed: Dec. 28, 2021

(65) Prior Publication Data
US 2023/0209398 A1    Jun. 29, 2023

(51) Int. Cl.
*H04W 4/00* (2018.01)
*H04W 28/02* (2009.01)
*H04W 28/086* (2023.01)

(52) U.S. Cl.
CPC ... *H04W 28/0284* (2013.01); *H04W 28/0242* (2013.01); *H04W 28/0861* (2023.05)

(58) Field of Classification Search
CPC ......... H04W 28/0284; H04W 28/0861; H04W 28/0242
See application file for complete search history.

(56) References Cited

U.S. PATENT DOCUMENTS

| | | | |
|---|---|---|---|
| 2012/0226797 A1* | 9/2012 | Ghosh | H04L 67/1008 709/224 |
| 2017/0347302 A1* | 11/2017 | Li | H04W 16/04 |
| 2019/0174571 A1* | 6/2019 | Deenoo | H04W 36/30 |
| 2019/0253945 A1* | 8/2019 | Paladugu | H04W 12/033 |
| 2020/0145967 A1* | 5/2020 | Park | H04W 72/27 |
| 2020/0196186 A1* | 6/2020 | Gupta | H04W 28/0247 |
| 2022/0232433 A1* | 7/2022 | Xu | H04W 36/0061 |
| 2022/0236365 A1* | 7/2022 | Ko | H04L 5/0048 |
| 2022/0361142 A1* | 11/2022 | Ko | H04W 28/26 |

* cited by examiner

*Primary Examiner* — Abdelnabi O Musa
(74) *Attorney, Agent, or Firm* — Shook, Hardy & Bacon L.L.P.

(57) ABSTRACT

The technology described herein reduces control-plane overloading by transferring UEs from the overloaded control plane to another available control plane. At a high level, the technology identifies when a control plane is overloaded, identifies other available control planes in a geographic area served by the overloaded control plane, and then identifies UEs for transfer using one or more criteria. Initially, a measure of control-plane performance for a control plane is received. Next, a determination is made that the control plane is overloaded by comparing the measure of control-plane performance to an overload threshold. When an overload condition exists for a control plane, then UEs with existing communication sessions using the control plane are identified for transfer.

20 Claims, 7 Drawing Sheets

CONTROL-PLANE OVERLOAD MANAGEMENT

CROSS-REFERENCE TO RELATED APPLICATIONS

None.

SUMMARY

At a very high level, the technology described herein improves communication quality and device efficiency by identifying overloaded control planes and taking mitigation actions that relieve the overloading. The technology is applicable to control planes in various radio access technologies, such as LTE and 5G. The mitigation can include transferring a user equipment ("UE") that is using the overloaded control plane to a different control plane.

When a control plane is overloaded, then devices not currently in an ongoing communication session may be denied access to the network. Mitigating the overload allows devices that could not otherwise access the network to access the network and start a communication session. The inability to join the network can leave a UE without the ability to receive data, text, calls, video, and the like. Mitigating the overload allows new UEs to access the network and to access it more efficiently (e.g., without failed attempts).

At a high level, the technology identifies when a control plane is overloaded, identifies other available control planes in all of or portions of a geographic area served by the overloaded control plane, and then identifies UEs for transfer using one or more criteria. In one aspect, four different criteria are used to identify UEs for transfer.

Initially, a measure of control-plane performance for a control plane is received. The measure of control-plane performance may be an elapsed time to process the control-plane protocol stack for a UE. In one aspect, the elapsed time is collected for each UE in a coverage area. The elapsed time may be collected by a node providing the control plane.

Next, a determination is made that the control plane is overloaded by comparing the measure of control-plane performance to an overload threshold. When an overload condition exists for a control plane, then UEs with existing communication sessions using the control plane are identified for transfer. A first identification step may be to determine other control planes with overlapping coverage with the overloaded control plane. Next, the load of the overlapping control planes is assessed to determine whether any of the overlapping control planes are also overloaded. Any non-overloaded control planes that overlap the overloaded control plane become candidates for receiving a transferred UE. Next, candidate UEs that are geographically located within areas served by the non-overloaded overlapping control planes are identified.

The candidate UEs are evaluated using a criteria to select the UEs that will eventually be transferred. In one aspect, the criteria are implemented sequentially. A first criteria may be used to identify a first UE or group of UEs to transfer. Once the first group is transferred, then a determination may be made whether the control plane is still overloaded. If the control plane is still overloaded, then a second criteria may be used to identify additional UEs to transfer. Once the second transfer is complete, then a determination may be made whether the control plane is still overloaded. If the control plane is still overloaded, then a third criteria may be used to identify additional UEs to transfer. Once the third transfer is complete, then a determination may be made whether the control plane is still overloaded. If the control plane is still overloaded, then a fourth criteria may be used to identify additional UEs to transfer. The goal of the criteria is to select UEs that will free up the largest amount of control plane capacity when transferred. In other words, the criteria attempts to improve upon the benefit derived by random selection of UEs. If at any point, the control plane is no longer overloaded, then the process to identify transfer candidates may stop.

BRIEF DESCRIPTION OF THE DRAWINGS

Illustrative embodiments of the present invention are described in detail below with reference to the attached drawing figures, and wherein.

DETAILED DESCRIPTION

The subject matter of embodiments of the invention is described with specificity herein to meet statutory requirements. However, the description itself is not intended to limit the scope of this patent. Rather, the inventor has contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

| | |
|---|---|
| 3G | Third-Generation Wireless Technology |
| 4G | Fourth-Generation Cellular Communication System |
| 5G | Fifth-Generation Cellular Communication System |
| BS | Base Station |
| BTS | Base Transceiver Station |
| CD-ROM | Compact Disk Read Only Memory |
| CDMA | Code Division Multiple Access |
| CDMA2000 | Code Division Multiple Access 2000 |

-continued

| | |
|---|---|
| DL | Downlink |
| eNodeB | Evolved Node B |
| EN-DC | E-UTRA (Evolved-Universal Terrestrial Radio Access) NR (New Radio)-Dual Connectivity |
| FDD | Frequency Division Duplex |
| gNodeB | Next Generation Node B |
| GPRS | General Packet Radio Service |
| GSM | Global System for Mobile communications |
| DVD | Digital Versatile Discs |
| EEPROM | Electrically Erasable Programmable Read Only Memory |
| HSDPA | High-Speed Downlink Packet Access |
| IoT | Internet of Things |
| LED | Light Emitting Diode |
| LTE | Long Term Evolution |
| MD | Mobile Device |
| MME | Mobility Management Entity |
| NR | New Radio |
| PC | Personal Computer |
| PCS | Personal Communications Service |
| PDA | Personal Digital Assistant |
| RAM | Random Access Memory |
| RF | Radio-Frequency |
| RFI | Radio-Frequency Interference |
| ROM | Read Only Memory |
| SMS | Short Message Service |
| TDD | Time Division Duplex |
| TDMA | Time Division Multiple Access |
| TXRU | Transceiver (or Transceiver Unit) |
| UE | User Equipment |
| UL | Uplink |
| UMTS | Universal Mobile Telecommunications Service |
| QCI | Quality of Service Class Identifier |
| VoLTE | Voice over Long-Term Evolution |
| WCDMA | Wideband Code Division Multiple Access |
| WiMAX | Worldwide Interoperability for Microwave Access |

Further, various technical terms are used throughout this description. An illustrative resource that fleshes out various aspects of these terms can be found in Newton's Telecom Dictionary, 31st Edition (2018).

At a very high level, the technology described herein improves communication quality and device efficiency by identifying overloaded control planes and taking mitigation actions that relieve the overloading. The technology is applicable to control planes in various radio access technologies, such as LTE and 5G. The mitigation can include transferring a user equipment ("UE") that is using the overloaded control plane to a different control plane.

When a control plane is overloaded, then devices not currently in an ongoing communication session may be denied access to the network. Mitigating the overload allows devices that could not otherwise access the network to access the network and start a communication session. The inability to join the network can leave a UE without the ability to receive data, text, calls, video, and the like. Alternatively, an overloaded control plane might cause a UE to make multiple attempts before access to the network is granted. The multiple attempts required to join the network wastes UE power and network resources. For example, the multiple attempts can use limited bandwidth allocated to the control plane, which further increases overloading at the physical layer (the physical layer is just one place a control plane bottleneck can occur).

Mitigating the overload allows new UEs to access the network and to access it more efficiently (e.g., without failed attempts). The mitigation also allows network resources to be used more efficiently. Various coverage areas overlap. The technology described herein allows a UE in overlapping coverage areas to be moved from a high-use control plane to a control plane with availability. Transferring a UE to a lower use control plane allows more of the network's resources to be used overall. Transferring a UE from one control plane to another can free up control plane resources for a UE that only has access to a single control plane.

At a high level, the technology identifies when a control plane is overloaded, identifies other available control planes in all of or portions of a geographic area served by the overloaded control plane, and then identifies UEs for transfer using one or more criteria. In one aspect, four different criteria are used to identify UEs for transfer.

Initially, a measure of control-plane performance for a control plane is received. The measure of control-plane performance may be an elapsed time to process the control-plane protocol stack for a UE. In one aspect, the elapsed time is collected for each UE in a coverage area. The elapsed time may be collected by a node providing the control plane. The elapsed time may be determined on the UE or at the node. This measure used to make an overload determination may be an average of individual measures from each UE using, or trying to use, the control plane. Other measures are possible, for example, the elapsed time to negotiate a protocol layer, such as the physical layer, of the protocol stack may be used as the measure. The elapsed time taken to process any portion of the control-plane protocol stack could be used as the measure.

Next, a determination is made that the control plane is overloaded by comparing the measure of control-plane performance to an overload threshold. As mentioned, the measure could be an average elapsed time to process the control-plane protocol stack. The overload threshold is based on the measure used. Thus, an average elapsed time for processing the control-plane protocol stack derived from a group of UEs currently using the control plane may be compared to a normal average for processing the control-plane protocol stack. The overload threshold may be set at a load point where a noticeable user experience degradation occurs. For example, the threshold may be set to a point where the control-plane load causes UEs to be denied access, at least occasionally. That is to say, the threshold does not need to be set at a point where there is a complete impossibility of a new UE accessing the network. It may be preferable to set the threshold just before, or near, the load level that causes access requests to be denied. This threshold may vary from node to node, but may be determined by correlating access denial records with average control-plane protocol processing times near when the denial occurred. In one aspect, a normal elapsed time is 10 ms and an overload threshold is 15 ms.

When an overload condition is determined to exist for a control plane, then UEs with existing communication sessions using the control plane are identified for transfer. A first step may be to determine other control planes with overlapping coverage with the overloaded control plane. Next, the load of the overlapping control planes is assessed to determine whether any of the overlapping control planes are also overloaded. Any non-overloaded control planes that overlap the overloaded control plane become candidates for receiving a transferred UE. Next, candidate UEs that are geographically located within areas served by the non-overloaded overlapping control planes are identified.

The candidate UEs are evaluated using a criteria to select the UEs that will eventually be transferred. In one aspect, the criteria are implemented sequentially. A first criteria is used to identify a first UE or group of UEs to transfer. Once the first group is transferred, then a determination is made whether the control plane is still overloaded. If the control plane is still overloaded, then a second criteria is used to identify additional UEs to transfer. Once the second transfer is complete, then a determination is made whether the control plane is still overloaded. If the control plane is still overloaded, then a third criteria is used to identify additional UEs to transfer. Once the third transfer is complete, then a determination is made whether the control plane is still overloaded. If the control plane is still overloaded, then a fourth criteria is used to identify additional UEs to transfer. The goal of the criteria is to select UEs that will free up the largest amount of control plane capacity when transferred. In other words, the criteria attempts to improve upon the benefit derived by random selection of UEs. If at any point the control plane is no longer overloaded, then the process used to identify UEs for transfer may stop. For example, the process may stop after the first group transfers, the second group transfers, or the third group transfers.

In one aspect, the first transfer criteria is the UE having a signal radio bearer (SRB) usage above an SRB threshold. Alternatively, first transfer criteria could be the UE having a signal radio bearer (SRB) usage in a top usage group. For example, the 20 UEs with the highest SRB usage could be selected for transfer. Whether stack ranking or a usage threshold is implemented, the goal is to identify UEs that are using the largest amount of the control plane. SRBs are carried on the control plane and correlate directly to control plane loading.

In one aspect, the second transfer criteria is a UE having a data radio bearer (DRB) usage above a DRB threshold. Alternatively, first transfer criteria could be the UE having a data radio bearer (DRB) usage in a top usage group. For example, the 20 UEs with the highest DRB usage could be selected for transfer. Whether stack ranking or a usage threshold is implemented, the goal is to identify UEs that are using the largest amount of the control plane. DRBs are carried on the user plane, but still correlate indirectly to control plane loading. Transferring a UE with high DRB usage is more beneficial then selecting a UE at random.

In one aspect, the third transfer criteria is the UE being classified as an Internet of Things (IoT) device. IoT devices may not use much control plane capacity on an individual basis, but some areas have a large amount of Iot devices. Moving all of the IoT devices can free up significant control plane resources, in some cases.

In one aspect, the fourth transfer criteria is the fourth plurality of UEs having RSRP (Reference Signal Received Power) below an RSRP threshold. These devices may already experiencing poor performance and often use more control plane resources to maintain a connection that a UE with a normal RSRP. Transferring the UE with a low RSRP to a different control plane may also improve the performance experienced by the UE.

As used herein, user equipment (UE) (also referenced herein as a user device) can include any device employed by an end-user to communicate with a wireless telecommunication network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gauge, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station or access point. A UE can be, in an embodiment, similar to computing device 700 described herein with respect to FIG. 7.

As used herein, a user plane transports content (e.g., video, sound, images). User data may be transported between the network and a UE with data radio bearers (DRBs). EN-DC supports Master Cell Group (MCG) DRBs, MCG split DRBs, and Secondary Cell Group (SCG) DRBs. The user-data leg may a 5G or LTE leg or use some other technology.

The control plane carries control signaling. In EN-DC operation, a mobile device must comprehend both the LTE and NR RRC control signaling. To transport these RRC messages between the network and a mobile device, a set of signaling radio bearers (SRBs) are used possibly including, but not limited to, Master Cell Group (MCG) SRB (SRB1, SRB2), Split SRB (SRB1+SRB1S, SRB2+SRB2S), and Secondary Cell Group (SCG) SRB (SRB3). Aspects of the technology are not limited to use with EN-DC operations.

Figure 1:
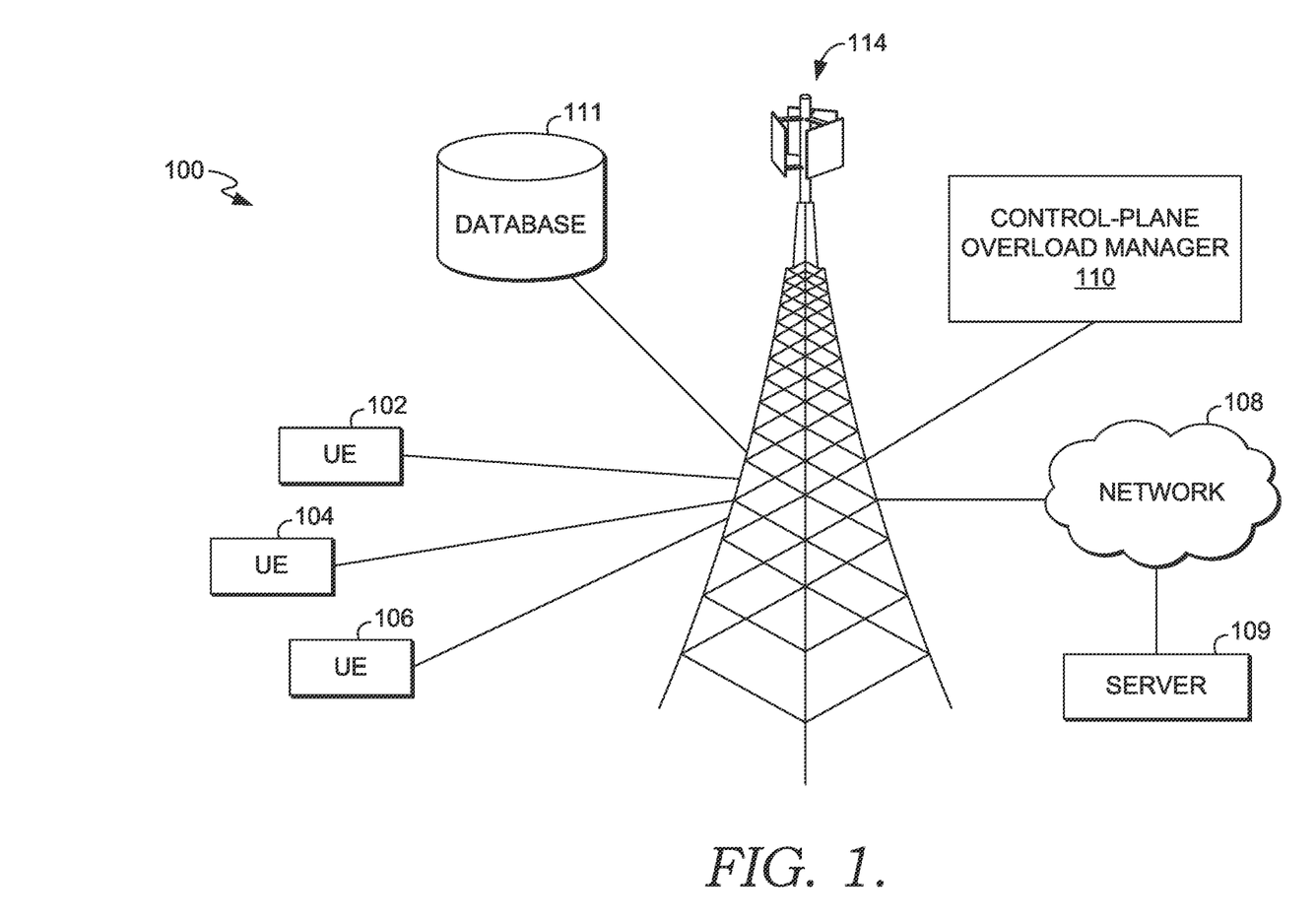
FIG. 1 depicts an exemplary wireless telecommunications network, according to an implementation of an embodiment of the present invention.

Referring to FIG. 1, an exemplary network environment suitable for use in implementing embodiments of the present disclosure is provided. Such a network environment as illustrated in FIG. 1 is designated generally as network environment 100. Network environment 100 is but one example of a suitable network environment and is not intended to suggest any limitation as to the scope of use or functionality of the disclosure. Neither should network environment 100 be interpreted as having any dependency or requirement relating to any one or combination of components illustrated.

Network environment 100 includes user devices 102, 104, and 106, access point 114 (which may be a cell site, node, base transceiver station (also known as a base station), communication tower, a small cell, or the like), network 108, server 109, initial radio technology selector 110, and database 111. In network environment 100, user devices can take on a variety of forms, such as a personal computer (PC), a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the server 109 or the computing device 700 of FIG. 7) that communicates via wireless communications with the access point 114 in order to interact with a public or private network. In this regard, the user device can be any mobile computing device that communicates by way of a wireless network, for example, a 1× circuit voice, a 3G network (e.g., CDMA, CDMA2000, WCDMA, GSM, UMTS), a 4G network (WiMAX, LTE, HSDPA), a 5G network, or any other type of network.

In some cases, the user devices 102, 104, and 106 in network environment 100 can optionally utilize network 108 to communicate with other computing devices (e.g., a mobile device(s), a server(s), a personal computer(s), etc.) through access point 114. The network 108 may be a telecommunications network(s), or a portion thereof. A telecommunications network might include an array of devices or components (e.g., one or more base stations), some of which are not shown. Those devices or components may form network environments similar to what is shown in FIG. 1, and may perform methods in accordance with the present disclosure. Components, such as terminals, links, and nodes (as well as other components) can provide connectivity in various implementations. Network 108 can include multiple networks, as well as being a network of networks, but is shown in more simple form so as to not obscure other aspects of the present disclosure.

Continuing, network 108 can be part of a telecommunication network that connects subscribers to their immediate service provider. In some instances, network 108 can be associated with a telecommunications provider that provides services to user devices 102, 104, and 106. For example, network 108 may provide voice, SMS, video, or data services to user devices corresponding to users that are registered or subscribed to utilize the services provided by a telecommunications provider. Similarly, network 108 may provide services to user devices that correspond to relays, fixed sensors, internet of things (IoT) enabled devices, or any other device that provide connectivity or data to other devices. Network 108 can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network. In aspects, the network 108 may enable communication over both TDD and FDD technology.

Generally, access point 114 is configured to communicate with user devices, such as user devices 102, 104, and 106 that are located within the geographical area, or cell, covered by radio antennas of a cell site (i.e. access point 114). Access point 114 can include one or more base stations (such as a gNodeB), base transmitter stations, radios, antennas, antenna arrays, power amplifiers, transmitters/receivers, digital signal processors, control electronics, GPS equipment, and the like. Access point 114 can include a wireless communications station that is installed at a fixed location, (e.g., a telecommunication tower) or a mobile base station (e.g., small cell) in some embodiments. In some embodiments, access point 114 also includes or is associated with an LTE System Manager (LSM) configured to manage a master list (e.g., a table) of amplitude weights. The list of amplitude weights may include a plurality of amplitude, phase, and power weights applicable to a plurality of antennas, antenna model numbers, radios, tilt angles of antennas, and the like. The listing may also include amplitude, phase, and power weights applicable to various broadcast configurations, such as multi-beam or unified beam. Illustrative wireless telecommunications technologies include CDMA, CDMA2000, GPRS, TDMA, GSM, WCDMA, UMTS, and the like.

The back-end system can include one or more computing devices or servers 108, which are connected to the RAN. For example, machine-learning algorithms can be leveraged to identify patterns and predict changes in the network environment, including movement patterns of UEs. Machine learning algorithms include Regression algorithms, Instance-Based algorithms, Regularization algorithms, Decision Tree algorithms, Bayesian algorithms, Clustering algorithms, Association Rule Learning algorithms, Artificial Neural Network algorithms, Deep Learning algorithms, Dimensionality Reduction algorithms, Ensemble algorithms, to name a few.

The control-plane overload manager 110 determines whether a control plane is overloaded and then initiates a mitigation to relieve overloading. The mitigation process used by the control-plane overload manager 110 is described in detail elsewhere herein, for example, with reference to FIGS. 2-6. At a high level, the control-plane overload manager 110 identifies when a control plane is overloaded, identifies other available control planes in all of or portions of a geographic area served by the overloaded control plane, and then identifies UEs for transfer using one or more criteria. In one aspect, four different criteria are used to identify UEs for transfer.

Figure 2:
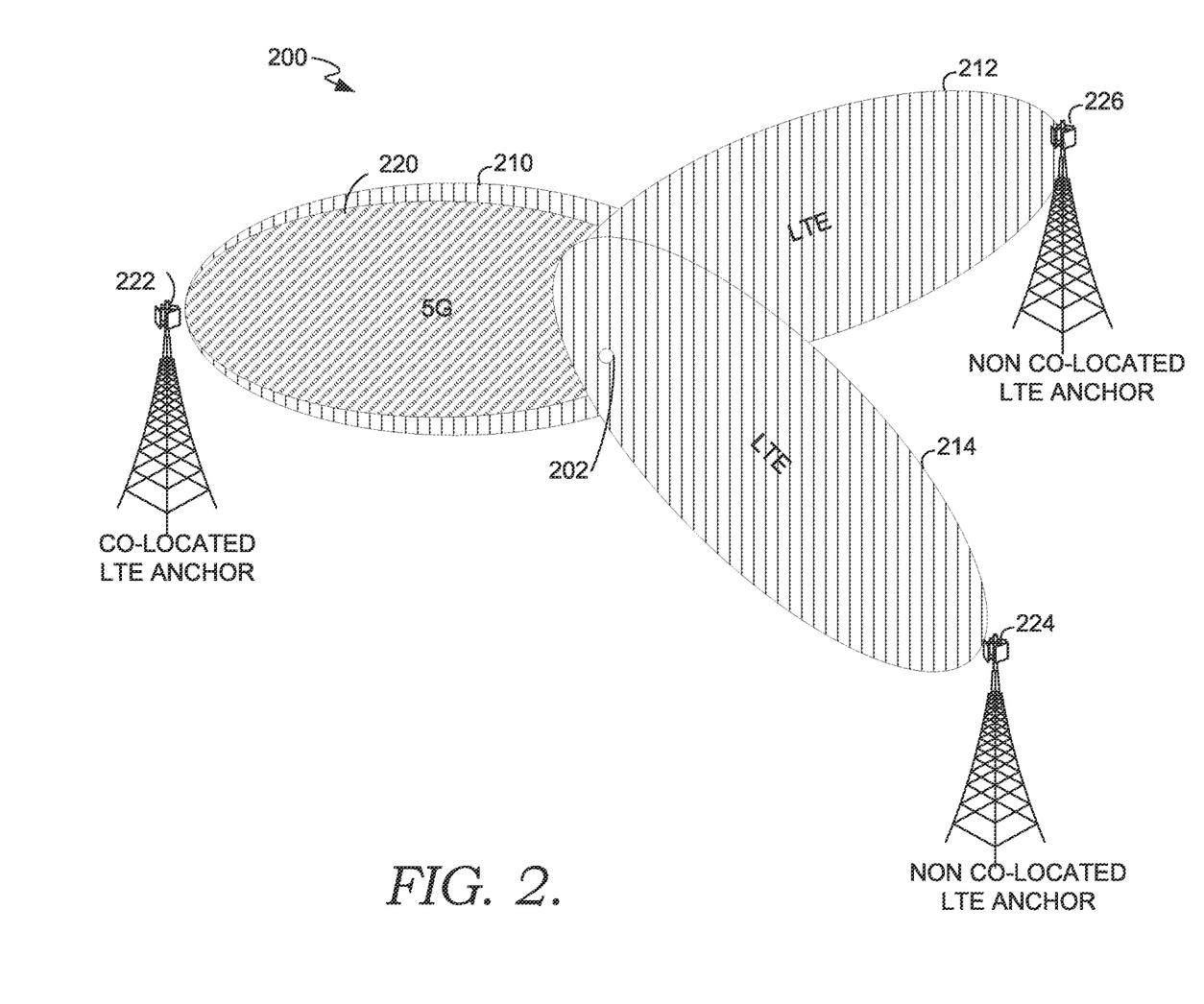
FIG. 2 depicts an exemplary coverage area with overlapping radio technology coverage areas, according to an implementation of an embodiment of the present invention.

In FIG. 2, a wireless telecommunications network 200 is shown with LTE coverage areas 210, 212, and 214. LTE coverage areas 210, 212, and 214 may comprise a BTS to transmit and receive RF signals with UEs, such as UE 202. In FIG. 2, LTE coverage areas 210, 212, and 214 define an area where RF signals are transmitted using the LTE radio technology and received by an access point. LTE coverage area 210 is enabled by an eNodeB at BTS 222, which is described as a co-located LTE anchor because a 5G node is also located at BTS 222. LTE coverage area 214 is enabled by an eNodeB at BTS 224, which is described as a non co-located LTE anchor because a 5G node is not located at BTS 224. LTE coverage area 212 is enabled by an eNodeB at BTS 226, which is described as a non co-located LTE anchor because a 5G node is not located at BTS 226.

FIG. 2 also includes 5G coverage area 220. 5G coverage area 220 may comprise a BTS to transmit and receive RF signals with UEs, such as UE 202. In FIG. 2, 5G coverage area 220 defines an area where RF signals are transmitted using 5G radio technology and received by an access point for communication purposes. 5G coverage area 220 is enabled by a gNodeB at BTS 222.

FIG. 2 illustrates a context in which aspects the technology described herein may help mitigate control plane overloading. The UE 202 is located within LTE coverage areas 210, 212, and 214 and 5G coverage area 220. With the UE 202 in this location, an EN-DC communication session may be initiated. In some circumstances, the technology may select between multiple LTE or 5G services, such as provided by different nodes or in different frequency bands. In this context, the two technologies do not have overlapping coverage in much of the area depicted, but overlapping coverage can be provided by three different combinations around UE 202. In each combination, the 5G leg originates at BTS 222 and is represented by 5G-coverage area 220. The LTE leg, which may carry the control plane, can be provided by the eNodeB at BTS 222, 224, or 226.

The eNodeBs at BTS 222, 224, and 226 may each have their own control-plane performance measures for the coverage area in which UE 202 is located. The performance measure is based on performance data gathered by each respective node. If the control plane associated with BTS 224 is determined to be overloaded, then the UE 202 may be transferred to control planes provided by BTS 222 or BTS 226. As described subsequently, UE 202 may be transferred if it satisfies a transfer criteria, such an SRB usage over a threshold. Similarly, the control planes may be checked to ensure they are not also overloaded.

Figure 3:
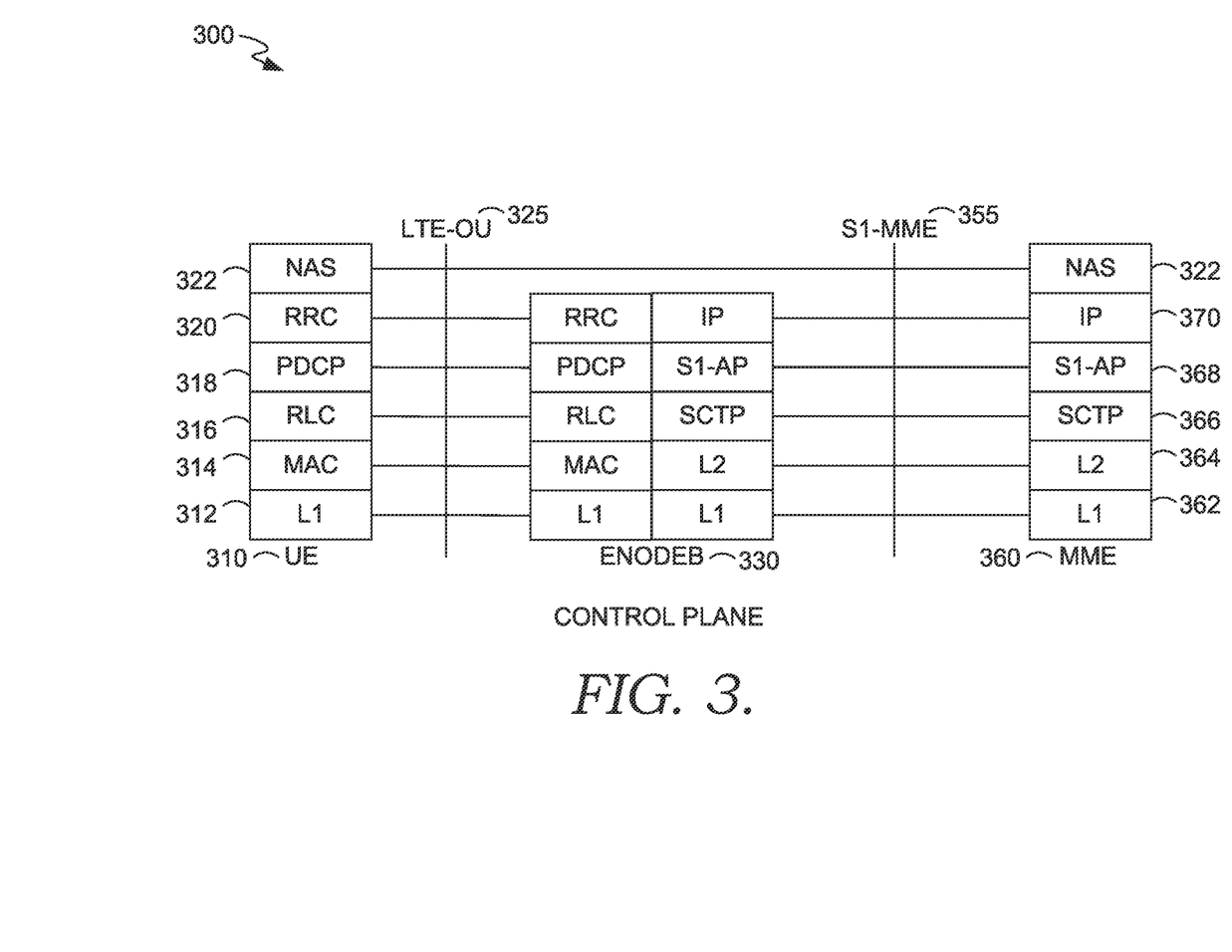
FIG. 3 depicts an control plane protocol stack, according to an implementation of an embodiment of the present invention.

Turning to FIG. 3, an exemplary LTE control-plane protocol stack 300 is shown. Aspects of the technology may be used with LTE, 5G or other radio access technology that uses a control plane. FIG. 3 is included as an example control plane, but is not meant to limit application of the technology to LTE technology. The radio protocol architecture for LTE (and 5G) can be separated into control plane architecture and user plane architecture. User plane architecture is not described in detail herein. On the user plane, packets in the core network (EPC) are encapsulated in a specific EPC protocol and tunneled between the P-GW and the eNodeB. Different tunneling protocols are used depending on the interface.

The control plane 300 handles radio-specific functionality, which depends on the state of the user equipment, which may be in idle or connected states. In the idle mode, the user equipment camps on a cell after a cell selection or reselection process where factors like radio link quality, cell status and radio access technology are considered. In the connected mode, the UE supplies the E-UTRAN with downlink channel quality and neighbor cell information (including other frequencies and radio access technologies) to enable the E-UTRAN to select the most suitable cell for the UE. In this case, control plane protocol includes the RRC protocol.

The control plane architecture 300 includes a UE 310, an eNodeB 330, and a Mobility Management Entity (MME) 360. The UE connects to the eNodeB 330 over the LTE-Uu interface 325. The eNodeB 330 connects to the MME 360 through the S1-MME interface 355. The eNodeB provides users with the radio interfaces and performs Radio Resource Management (RRM) functions, such as dynamic resource allocation, radio admission control, connection mobility control and Radio Bearer (RB) control and Inter-Cell Interference Coordination (ICIC). The MME 360 is the main control entity for the E-Utran. Among other functions, the MME 360 can provide user authentication and mobility management. The S1-MME interface 355 is responsible for delivering signaling protocols between the eNodeB 330 and the MME 360. The S1-MME interface 355 consists of a Stream Control Transmission Protocol (SCTP) over IP and supports multiple UEs through a single SCTP association. The S1-MME interface 355 is responsible for Evolved Packet System (EPS) bearer setup/release procedures, the handover signaling procedure, the paging procedure and the NAS transport procedure.

The UE protocol stack includes L1 (layer 1) 312, MAC 314, RLC 316, PDCP 318, RRC 320, and NAS 322. Physical Layer (Layer 1) 312 is the physical layer, which carries all information from the MAC transport channels over the air interface.

The Medium Access Layer (MAC) 314 is responsible for Mapping between logical channels and transport channels, Multiplexing of MAC SDUs from one or different logical channels onto transport blocks (TB) to be delivered to the physical layer on transport channels, de-multiplexing of MAC SDUs from one or different logical channels from transport blocks (TB) delivered from the physical layer on transport channels, Scheduling information reporting, Error correction through HARQ, Priority handling between UEs by means of dynamic scheduling, Priority handling between logical channels of one UE, Logical Channel prioritization.

The Radio Link Control (RLC) 316 is responsible for transfer of upper layer PDUs, error correction through ARQ, Concatenation, segmentation and reassembly of RLC SDUs (Only for UM and AM data transfer).

The PDCP Layer 318 is responsible for Header compression and decompression of IP data, Transfer of data (user plane or control plane), Maintenance of PDCP Sequence Numbers (SNs), In-sequence delivery of upper layer PDUs at re-establishment of lower layers, Duplicate elimination of lower layer SDUs at re-establishment of lower layers for radio bearers mapped on RLC AM, Ciphering and deciphering of user plane data and control plane data, Integrity protection and integrity verification of control plane data, Timer based discard, duplicate discarding, PDCP is used for SRBs and DRBs mapped on DCCH and DTCH type of logical channels.

The functions of the radio resource control (RRC) layer include broadcast of System Information related to the non-access stratum (NAS), broadcast of System Information related to the access stratum (AS), Paging, establishment, maintenance and release of an RRC connection between the UE and E-UTRAN, Security functions including key management, establishment, configuration, maintenance and release of point-to-point Radio Bearers.

The Non Access Stratum (NAS) Protocols 322 form the highest stratum of the control plane between the UE 310 and MME 330. NAS protocols support the mobility of the UE and the session management procedures to establish and maintain IP connectivity between the UE and a PDN GW.

The S1-AP protocol 368 supports functions, such as S1 interface management, E-RAB management, NAS signaling transport and UE context management. It delivers the initial UE context to the eNB to setup E-RAB(s) and manages modification or release of the UE context thereafter.

The SCTP (Stream Control Transmission Protocol) layer 366 SCTP is the transport layer of S1-MME signalling bearer.

The L2 layer 364 is a data link layer that supports suitable data link layer protocols, (e.g. PPP, Ethernet).

The IP layer 370 supports point-to-point transmission of S1-AP messages. The eNB and MME support IPv6 and/or IPv4.

The time taken to process the control plane protocol may be measured as the time elapsed between processing the NAS layer 322 and the L1 layer 312. In other aspects, the time taken to process a particular subset of layers may be used as an alternative measure.

Figure 4:
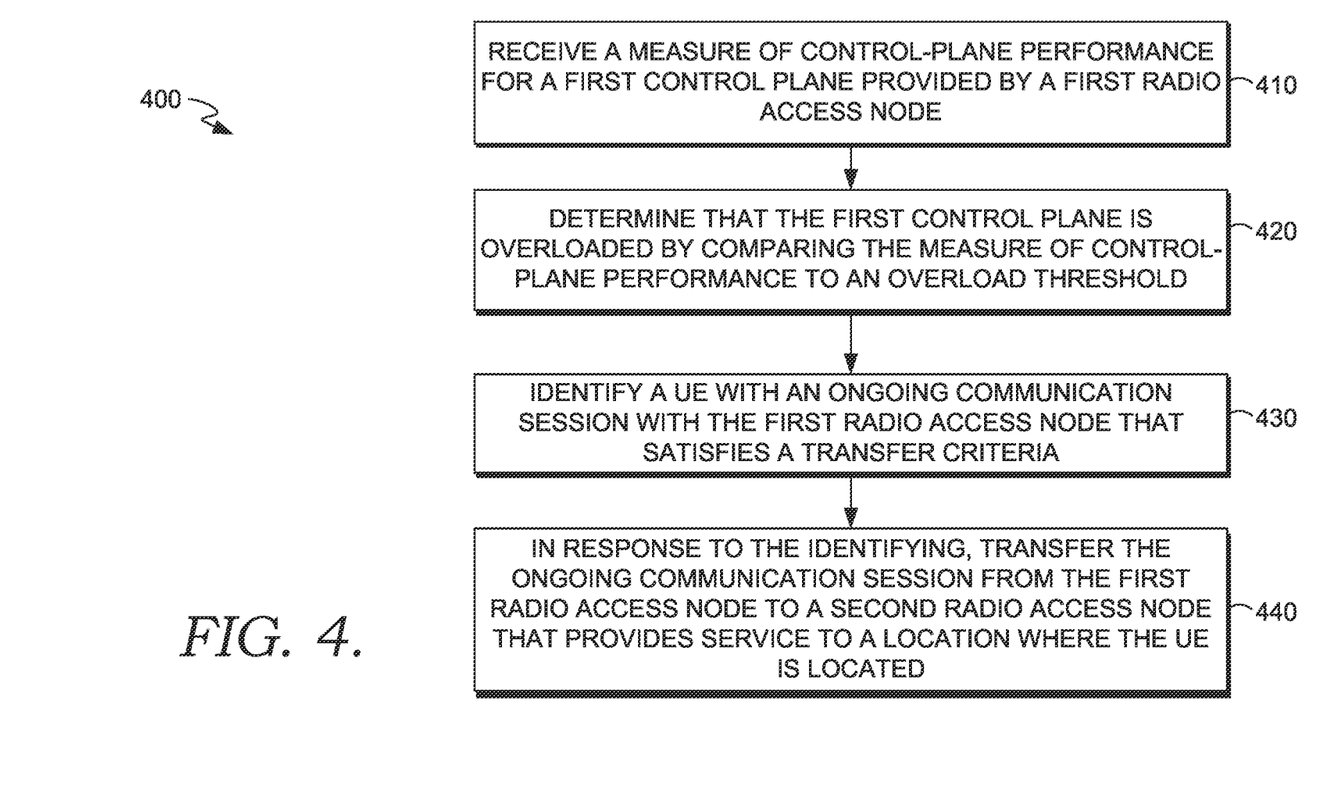
FIGS. 4-6 show methods for managing control-plane overloads, according to an implementation of an embodiment of the present invention.
Figure 5:
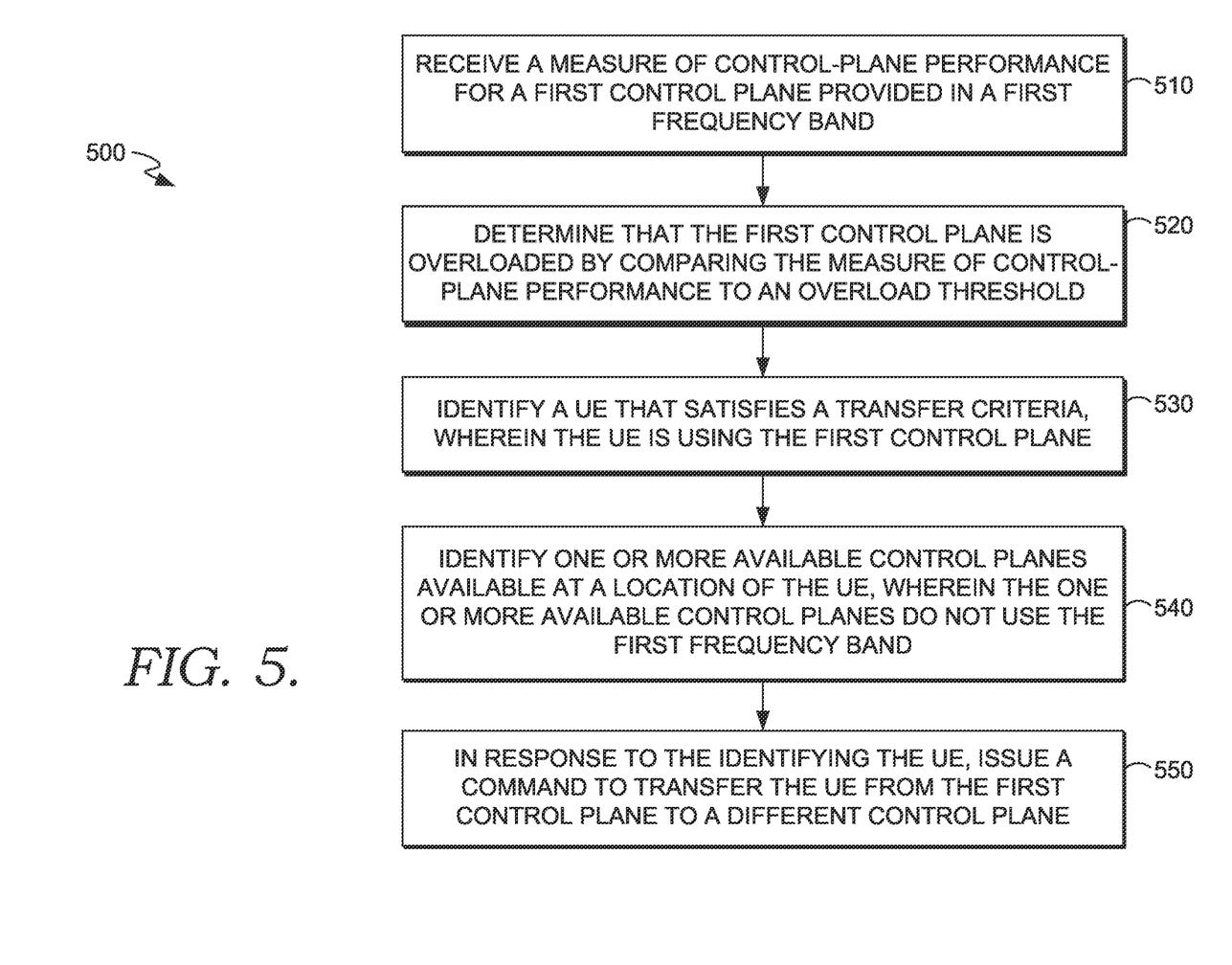
Figure 6:
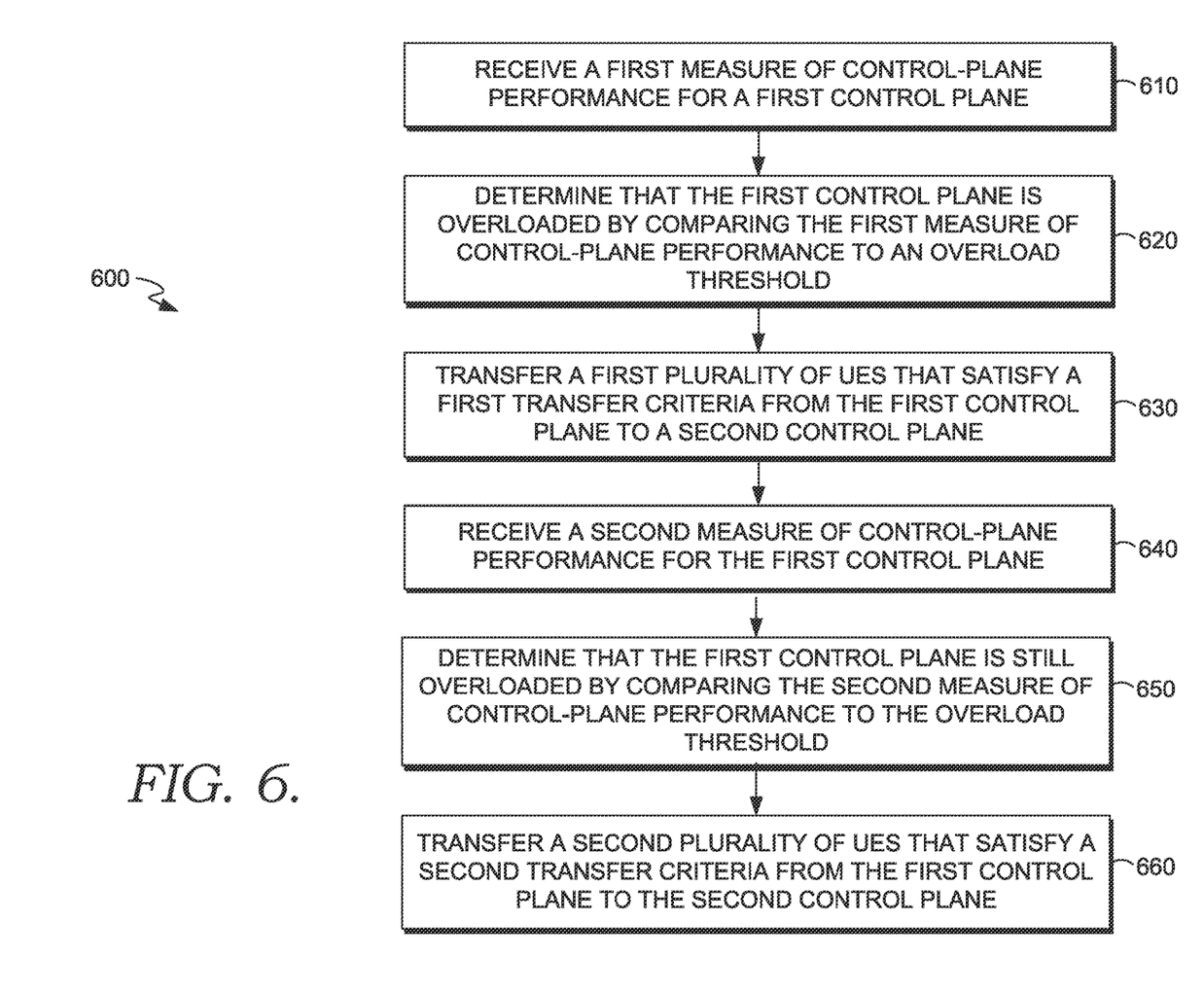

Now referring to FIGS. 4-6, each block of methods 400, 500, and 600, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be provided by a standalone application, a service or hosted service (standalone or in combination with another hosted service), or a plug-in to another product, to name a few. In addition, methods 400, 500, and 600 are described, by way of example, with respect to the control-plane overload manager 110 of FIG. 1 and additional features of FIG. 2. However, these methods may additionally or alternatively be executed by any one system, or any combination of systems, including, but not limited to, those described herein.

FIG. 4 is a flow diagram showing a method 400 for managing a control plane overload, in accordance with some embodiments of the present disclosure. At step 410, the method includes, receiving a measure of control-plane performance for a first control plane provided by a first radio access node. A control plane is provided by a node (e.g., gNodeB). A node providing the control plane is one way to identifying a specific control plane.

The measure of control-plane performance may be an elapsed time to process the control-plane protocol stack for a UE. In one aspect, the elapsed time is collected for each UE in a coverage area. The elapsed time may be collected by a node providing the control plane. The elapsed time may be determined on the UE or at the node. This measure used to make an overload determination may be an average of individual measures from each UE using, or trying to use, the control plane. Other measures are possible, for example, the elapsed time to negotiate a protocol layer, such as the physical layer, of the protocol stack may be used as the measure. The elapsed time taken to process any portion of the control-plane protocol stack could be used as the measure.

At step 420, the method includes, determining that the first control plane is overloaded by comparing the measure of control-plane performance to an overload threshold. As mentioned, the measure could be an average elapsed time to process the control-plane protocol stack. The overload threshold is based on the measure used. Thus, an average elapsed time for processing the control-plane protocol stack derived from a group of UEs currently using the control plane may be compared to a normal average for processing the control-plane protocol stack. The overload threshold may be set at a load point where a noticeable user experience degradation occurs. For example, the threshold may be set to a point where the control-plane load causes UEs to be denied access, at least occasionally. That is to say, the threshold does not need to be set at a point where there is a complete impossibility of a new UE accessing the network. It may be preferable to set the threshold just before, or near, the load level that causes access requests to be denied. This threshold may vary from node to node, but may be determined by correlating access denial records with average control-plane protocol processing times near when the denial occurred. In one aspect, a normal elapsed time is 10 ms and an overload threshold is 15 ms.

At step 430, the method includes identifying a UE with an ongoing communication session with the first radio access node that satisfies a transfer criteria. The candidate UEs are evaluated using a criteria to select the UEs that will eventually be transferred. In one aspect, the criteria are implemented sequentially. A first criteria is used to identify a first UE or group of UEs to transfer. Once the first group is transferred, then a determination is made whether the control plane is still overloaded. If the control plane is still overloaded, then a second criteria is used to identify additional UEs to transfer. Once the second transfer is complete, then a determination is made whether the control plane is still overloaded. If the control plane is still overloaded, then a third criteria is used to identify additional UEs to transfer. Once the third transfer is complete, then a determination is made whether the control plane is still overloaded. If the control plane is still overloaded, then a fourth criteria is used to identify additional UEs to transfer. The goal of the criteria is to select UEs that will free up the largest amount of control plane capacity when transferred. In other words, the criteria attempts to improve upon the benefit derived by random selection of UEs. If at any point the control plane is no longer overloaded, then the process used to identify UEs for transfer may stop. For example, the process may stop after the first group transfers, the second group transfers, or the third group transfers.

At step 440, the method includes in response to the identifying, transferring the ongoing communication session from the first radio access node to a second radio access node that provides service to a location where the UE is located. In one aspect, a configuration message specifies a prioritized list of control planes for UE transfer. In some aspects, only a single control plane may be available, in which case the list will comprise a single control plane for transfer. When multiple control planes are available, then the list can be prioritized based on various criteria, such as current loading or anticipated performance (based on historical performance data). In general, the priority criteria may transfer UEs to control planes with the most availability and highest anticipated performance. These two criteria may be balanced against each other using a weighted combination.

FIG. 5 is a flow diagram showing a method 500 for managing a control plane overload, in accordance with some embodiments of the present disclosure.

At step 510, the method includes receiving a measure of control-plane performance for a first control plane provided in a first frequency band. A control plane will have a frequency band. Some radio towers may have multiple available control planes provided in different frequency bands. A frequency band is one way to identifying a specific control plane.

The measure of control-plane performance may be an elapsed time to process the control-plane protocol stack for a UE. In one aspect, the elapsed time is collected for each UE in a coverage area. The elapsed time may be collected by a node providing the control plane. The elapsed time may be determined on the UE or at the node. This measure used to make an overload determination may be an average of individual measures from each UE using, or trying to use, the control plane. Other measures are possible, for example, the elapsed time to negotiate a protocol layer, such as the physical layer, of the protocol stack may be used as the measure. The elapsed time taken to process any portion of the control-plane protocol stack could be used as the measure.

At step 520, the method includes determining that the first control plane is overloaded by comparing the measure of control-plane performance to an overload threshold. As mentioned, the measure could be an average elapsed time to process the control-plane protocol stack. The overload threshold is based on the measure used. Thus, an average elapsed time for processing the control-plane protocol stack derived from a group of UEs currently using the control plane may be compared to a normal average for processing the control-plane protocol stack. The overload threshold may be set at a load point where a noticeable user experience degradation occurs. For example, the threshold may be set to a point where the control-plane load causes UEs to be denied access, at least occasionally. That is to say, the threshold does not need to be set at a point where there is a complete impossibility of a new UE accessing the network. It may be preferable to set the threshold just before, or near, the load level that causes access requests to be denied. This threshold may vary from node to node, but may be determined by correlating access denial records with average control-plane protocol processing times near when the denial occurred. In one aspect, a normal elapsed time is 10 ms and an overload threshold is 15 ms.

At step 530, the method includes identifying a UE that satisfies a transfer criteria, wherein the UE is using the first control plane. The candidate UEs are evaluated using a criteria to select the UEs that will eventually be transferred. In one aspect, the criteria are implemented sequentially. A first criteria is used to identify a first UE or group of UEs to transfer. Once the first group is transferred, then a determination is made whether the control plane is still overloaded. If the control plane is still overloaded, then a second criteria is used to identify additional UEs to transfer. Once the second transfer is complete, then a determination is made whether the control plane is still overloaded. If the control plane is still overloaded, then a third criteria is used to identify additional UEs to transfer. Once the third transfer is complete, then a determination is made whether the control plane is still overloaded. If the control plane is still overloaded, then a fourth criteria is used to identify additional UEs to transfer. The goal of the criteria is to select UEs that will free up the largest amount of control plane capacity when transferred. In other words, the criteria attempts to improve upon the benefit derived by random selection of UEs. If at any point the control plane is no longer overloaded, then the process used to identify UEs for transfer may stop. For example, the process may stop after the first group transfers, the second group transfers, or the third group transfers.

At step 540, the method includes identifying one or more available control planes available at a location of the UE, wherein the one or more available control planes do not use the first frequency band. The location of the UE may be determined from location information provided by the UE. The location can be used to associate the UE with a hexbin or other subunit measure. A first step may be to determine other control planes with overlapping coverage with the overloaded control plane. Next, the load of the overlapping control planes may be assessed to determine whether any of the overlapping control planes are also overloaded. Any non-overloaded control planes that overlap the overloaded control plane become candidates for receiving a transferred UE. Next, candidate UEs that are geographically located within areas served by the non-overloaded overlapping control planes are identified.

At step 550, the method includes in response to the identifying the UE, issuing a command to transfer the UE from the first control plane to a different control plane. In one aspect, a configuration message specifies a prioritized list of control planes for UE transfer. In some aspects, only a single control plane may be available, in which case the list will comprise a single control plane for transfer. When multiple control planes are available, then the list can be prioritized based on various criteria, such as current loading or anticipated performance (based on historical performance data). In general, the priority criteria may transfer UEs to control planes with the most availability and highest anticipated performance. These two criteria may be balanced against each other using a weighted combination.

FIG. 6 is a flow diagram showing a method 600 for managing a control plane overload, in accordance with some embodiments of the present disclosure.

At step 610, the method includes receiving a first measure of control-plane performance for a first control plane. The measure of control-plane performance may be an elapsed time to process the control-plane protocol stack for a UE. In one aspect, the elapsed time is collected for each UE in a coverage area. The elapsed time may be collected by a node providing the control plane. The elapsed time may be determined on the UE or at the node. This measure used to make an overload determination may be an average of individual measures from each UE using, or trying to use, the control plane. Other measures are possible, for example, the elapsed time to negotiate a protocol layer, such as the physical layer, of the protocol stack may be used as the measure. The elapsed time taken to process any portion of the control-plane protocol stack could be used as the measure.

At step 620, the method includes determining that the first control plane is overloaded by comparing the first measure of control-plane performance to an overload threshold. As mentioned, the measure could be an average elapsed time to process the control-plane protocol stack. The overload threshold is based on the measure used. Thus, an average elapsed time for processing the control-plane protocol stack derived from a group of UEs currently using the control plane may be compared to a normal average for processing the control-plane protocol stack. The overload threshold may be set at a load point where a noticeable user experience degradation occurs. For example, the threshold may be set to a point where the control-plane load causes UEs to be denied access, at least occasionally. That is to say, the threshold does not need to be set at a point where there is a complete impossibility of a new UE accessing the network. It may be preferable to set the threshold just before, or near, the load level that causes access requests to be denied. This threshold may vary from node to node, but may be determined by correlating access denial records with average control-plane protocol processing times near when the denial occurred. In one aspect, a normal elapsed time is 10 ms and an overload threshold is 15 ms.

At step 630, the method includes transferring a first plurality of UEs that satisfy a first transfer criteria from the first control plane to a second control plane. In one aspect, the first transfer criteria is the UE having a signal radio bearer (SRB) usage above an SRB threshold. Alternatively, first transfer criteria could be the UE having a signal radio bearer (SRB) usage in a top usage group. For example, the 20 UEs with the highest SRB usage could be selected for transfer. Whether stack ranking or a usage threshold is implemented, the goal is to identify UEs that are using the largest amount of the control plane. SRBs are carried on the control plane and correlate directly to control plane loading. The first plurality of UEs could be one or more UEs.

At step 640, the method includes receiving a second measure of control-plane performance for the first control plane. The second measure may be the same as the first, but taken after the first transfer. In other words, the second measure represents loading of the control plane after the transfer of the first plurality of UEs is complete. For example, the second measure may be an averaged elapsed protocol processing time of the UEs left on the control plane after the first transfer. If the control plane is no longer overloaded, then no further action may be required and the overload mitigation can stop.

At step 650, the method includes determining that the first control plane is still overloaded by comparing the second measure of control-plane performance to the overload threshold.

At step 660, the method includes transferring a second plurality of UEs that satisfy a second transfer criteria from the first control plane to the second control plane. In one aspect, the second transfer criteria is a UE having a data radio bearer (DRB) usage above a DRB threshold. Alternatively, first transfer criteria could be the UE having a data radio bearer (DRB) usage in a top usage group. For example, the 20 UEs with the highest DRB usage could be selected for transfer. Whether stack ranking or a usage threshold is implemented, the goal is to identify UEs that are using the largest amount of the control plane. DRBs are carried on the user plane, but still correlate indirectly to control plane loading. Transferring a UE with high DRB usage is more beneficial then selecting a UE at random. The second plurality can include one or more UEs.

The mitigation process can repeat with different transfer criteria. Each time a plurality of UEs is transferred. New load measures may be collected and compared to the overload threshold. If the overload persists, then additional transfers based on additional selection criteria may occur. In one aspect, the additional selection criteria include lower or different thresholds then used previously. For example, an additional criteria could be SRB usage, but with a lower threshold usage than previously used in the first criteria.

Similarly, an additional criteria could DRB usage, but with a lower threshold than used in the second criteria.

Figure 7:
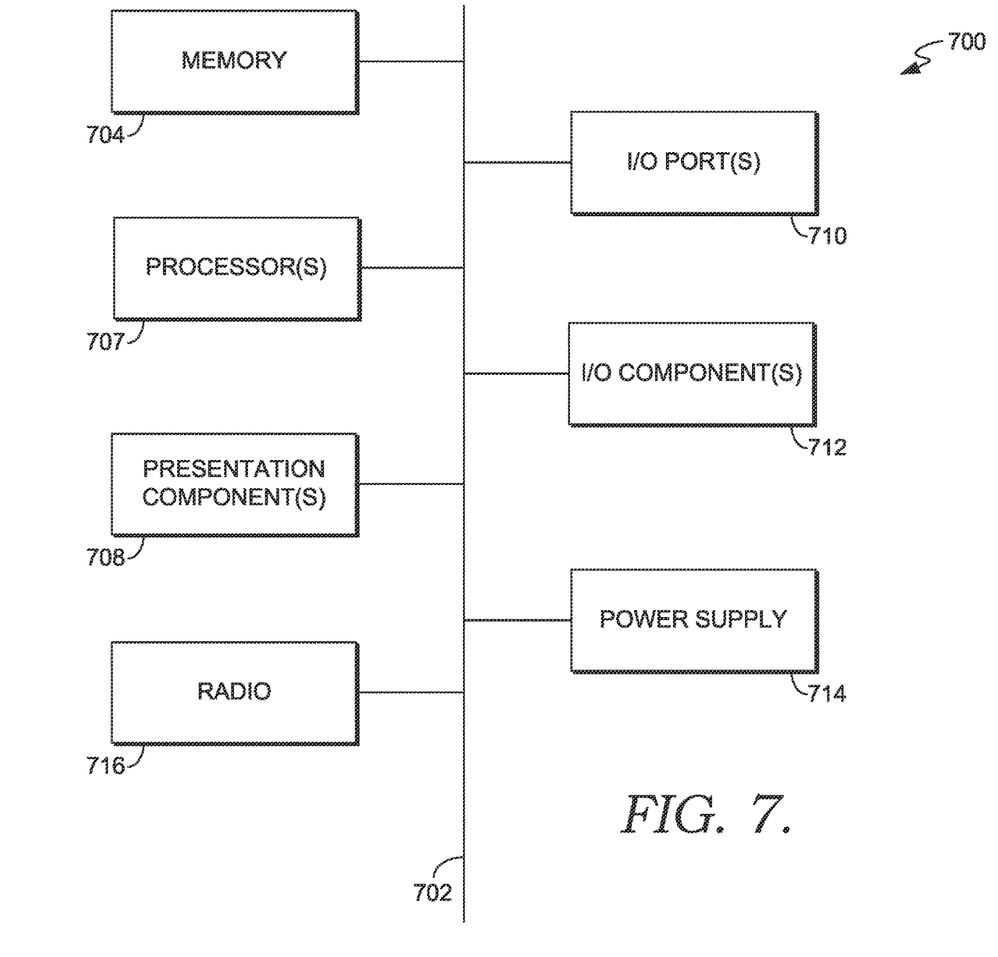
FIG. 7 depicts a block diagram of an exemplary computing environment suitable for use in implementing embodiments herein.

With reference to FIG. 7, computing device 700 includes a bus 702 that directly or indirectly couples the following devices: memory 704, one or more processors 706, one or more presentation components 708, input/output (I/O) ports 710, input/output (I/O) components 712, and an illustrative power supply 714. Bus 702 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterate that the diagram of FIG. 7 is merely illustrative of an example computing device that can be used in connection with one or more embodiments of the present invention. Distinction is not made between such categories as "workstation," "server," "laptop," "handheld device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media is non-transitory. In contrast to communication media, computer storage media is not a modulated data signal or any signal per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 704 includes computer-storage media in the form of volatile and/or nonvolatile memory. The memory may be removable, non-removable, or a combination thereof. Example hardware devices include solid-state memory, hard drives, optical-disc drives, etc. Computing device 700 includes one or more processors that read data from various entities such as memory 704 or I/O components 712. Presentation component(s) 708 present data indications to a user or other device. Example presentation components include a display device, speaker, printing component, vibrating component, etc.

I/O ports 710 allow computing device 700 to be logically coupled to other devices including I/O components 712, some of which may be built in. Illustrative components include a microphone, joystick, game pad, satellite dish, scanner, printer, wireless device, etc.

Radio 716 represents a radio that facilitates communication with a wireless telecommunications network. Illustrative wireless telecommunications technologies include CDMA, GPRS, TDMA, GSM, W-CDMA, EDGE, CDMA2000, and the like. Radio 716 might additionally or alternatively facilitate other types of wireless communications including Wi-Fi, WiMAX, LTE, 5G, or other VoIP communications. As can be appreciated, in various embodiments, radio 716 can be configured to support multiple technologies and/or multiple radios can be utilized to support multiple technologies.

The invention claimed is:

1. A method of managing a control plane overload, comprising:
   receiving a measure of control-plane performance for a first control plane provided by a first radio access node;
   determining that the first control plane is overloaded by comparing the measure of control-plane performance to an overload threshold;
   identifying a user equipment (UE) with an ongoing communication session with the first radio access node that satisfies a transfer criteria; and
   in response to the identifying, transferring the ongoing communication session from the first radio access node to a second radio access node that provides service to a location where the UE is located.

2. The method of claim 1, wherein the measure of control-plane performance is an amount of time taken to process through control plane protocols.

3. The method of claim 1, wherein the transfer criteria is the UE having a signal radio bearer (SRB) usage above an SRB threshold.

4. The method of claim 1, wherein the transfer criteria is the UE having a signal radio bearer (SRB) usage in a top usage group.

5. The method of claim 1, wherein the transfer criteria is the UE having a data radio bearer (DRB) usage above a DRB threshold.

6. The method of claim 1, wherein the transfer criteria is the UE having a data radio bearer (DRB) usage in a top usage group.

7. The method of claim 1, wherein the transfer criteria is the UE being classified as an Internet of Things (IoT) device.

8. The method of claim 1, wherein the transfer criteria is the UE having RSRP (Reference Signal Received Power) below an RSRP threshold.

9. A method for managing a control plane overload, comprising:
   receiving a measure of control-plane performance for a first control plane provided in a first frequency band;
   determining that the first control plane is overloaded by comparing the measure of control-plane performance to an overload threshold;
   identifying a user equipment (UE) that satisfies a transfer criteria, wherein the UE is using the first control plane;
   identifying one or more available control planes available at a location of the UE, wherein the one or more available control planes do not use the first frequency band; and in response to the identifying the UE, issuing a command to transfer the UE from the first control plane to a different control plane.

10. The method of claim 9, wherein the one or more available control planes are not provided by a node generating the first control plane.

11. The method of claim 9, wherein the method further comprises determining that the different control plane is not overloaded prior to the identifying one or more available control planes.

12. The method of claim 9, wherein the measure of control-plane performance is an amount of time taken to process through control plane protocols.

13. The method of claim 9, wherein the transfer criteria is the UE having a signal radio bearer (SRB) usage above an SRB threshold.

14. The method of claim 9, wherein the transfer criteria is the UE having a data radio bearer (DRB) usage above a DRB threshold.

15. One or more computer storage media comprising computer executable instructions embodied thereon, which when executed by a computing device cause the computing device to perform a method of managing a control plane overload, comprising:
   receiving a first measure of control-plane performance for a first control plane;
   determining that the first control plane is overloaded by comparing the first measure of control-plane performance to an overload threshold;
   transferring a first plurality of user equipment (UE)s that satisfy a first transfer criteria from the first control plane to a second control plane;
   receiving a second measure of control-plane performance for the first control plane;
   determining that the first control plane is still overloaded by comparing the second measure of control-plane performance to the overload threshold; and
   transferring a second plurality of UEs that satisfy a second transfer criteria from the first control plane to the second control plane.

16. The media of claim 15, wherein the method further comprises:
   receiving a third measure of control-plane performance for the first control plane;
   determining that the first control plane is still overloaded by comparing the third measure of control-plane performance to the overload threshold; and
   transferring a third plurality of UEs that satisfy a third transfer criteria from the first control plane to the second control plane.

17. The media of claim 16, wherein the method further comprises:
   receiving a fourth measure of control-plane performance for the first control plane;
   determining that the first control plane is still overloaded by comparing the fourth measure of control-plane performance to the overload threshold; and
   transferring a fourth plurality of UEs that satisfy a fourth criteria from the first control plane to the second control plane, wherein the fourth transfer criteria is the fourth plurality of UEs having RSRP (Reference Signal Received Power) below an RSRP threshold.

18. The media of claim 16, wherein the first measure of control-plane performance is an amount of time taken to process through control plane protocols.

19. The media of claim 16, wherein the first transfer criteria is the first plurality of UEs having a signal radio bearer (SRB) usage above an SRB threshold.

20. The media of claim 16, wherein the second transfer criteria is the second plurality of UEs having a data radio bearer (DRB) usage above a DRB threshold.

* * * * *